(12) United States Patent
Zink

(10) Patent No.: US 7,731,226 B2
(45) Date of Patent: Jun. 8, 2010

(54) VEHICLE SEAT SIDE AIR BAG ASSEMBLY

(75) Inventor: Silvia Zink, Kirchheim (DE)

(73) Assignee: Lear Corporation, Southfield, MI (US)

( * ) Notice: Subject to any disclaimer, the term of this patent is extended or adjusted under 35 U.S.C. 154(b) by 195 days.

(21) Appl. No.: 11/939,049

(22) Filed: Nov. 13, 2007

(65) Prior Publication Data
US 2008/0111355 A1 May 15, 2008

(30) Foreign Application Priority Data
Nov. 15, 2006 (DE) .................. 10 2006 053 911

(51) Int. Cl.
*B60R 21/207* (2006.01)
(52) U.S. Cl. .................................. 280/730.2
(58) Field of Classification Search ............ 280/728.1, 280/728.2, 728.3, 730.2; 297/216.1, 216.13
See application file for complete search history.

(56) References Cited

U.S. PATENT DOCUMENTS

| | | | | |
|---|---|---|---|---|
| 5,498,030 | A * | 3/1996 | Hill et al. .................. | 280/743.1 |
| 5,678,853 | A * | 10/1997 | Maly ........................ | 280/730.2 |
| 6,045,151 | A * | 4/2000 | Wu ........................... | 280/728.3 |
| 6,213,498 | B1 | 4/2001 | Ghalambor et al. | |
| 7,134,685 | B2 * | 11/2006 | Panagos et al. .......... | 280/730.2 |
| 7,331,601 | B2 * | 2/2008 | Tracht ..................... | 280/730.2 |
| 7,390,015 | B2 * | 6/2008 | Tracht ..................... | 280/730.2 |
| 7,458,603 | B2 * | 12/2008 | Buono et al. ............. | 280/728.2 |
| 2006/0113770 | A1 * | 6/2006 | Tracht ..................... | 280/730.2 |
| 2006/0113771 | A1 * | 6/2006 | Tracht ..................... | 280/730.2 |
| 2006/0113772 | A1 * | 6/2006 | Tracht ..................... | 280/730.2 |
| 2007/0085308 | A1 * | 4/2007 | Tracht et al. ............. | 280/730.2 |

FOREIGN PATENT DOCUMENTS

DE 10 2005 049 574 A1 4/2007
GB 2 433 919 A 7/2007

OTHER PUBLICATIONS

GB Search Report—Dated Dec. 10, 2007.

* cited by examiner

*Primary Examiner*—Paul N Dickson
*Assistant Examiner*—Robert A Coker
(74) *Attorney, Agent, or Firm*—Brooks Kushman P.C.

(57) ABSTRACT

A vehicle side air bag assembly (16) includes a resilient bolster (17) that is located on or adjacent one lateral side of a vehicle seat back. The bolster (17) includes a frame (22) supporting a foam pad (30) within a trim (32) having a release seam (34). Deployment of an air bag module(36) the bolster (17) is controlled by an air bag guide (42) which has a pair of flexible panels (44, 46). One flexible panel (44) has an outer extremity including a first connection (50) to the bolster and the other flexible panel (46) has an outer extremity including a second connection (54) to the trim cover in a spaced relationship from the first connection.

11 Claims, 3 Drawing Sheets

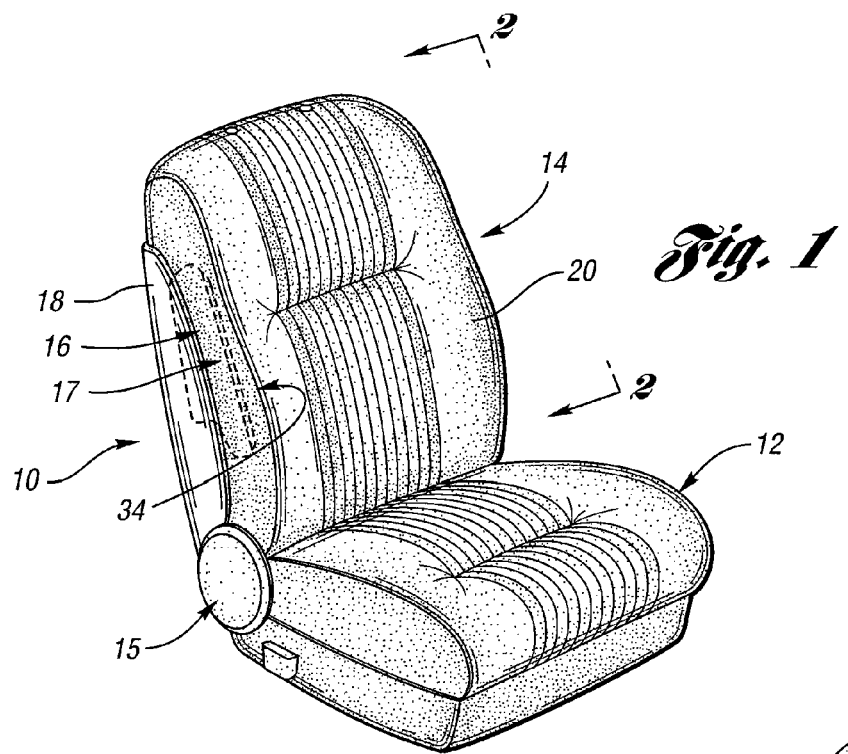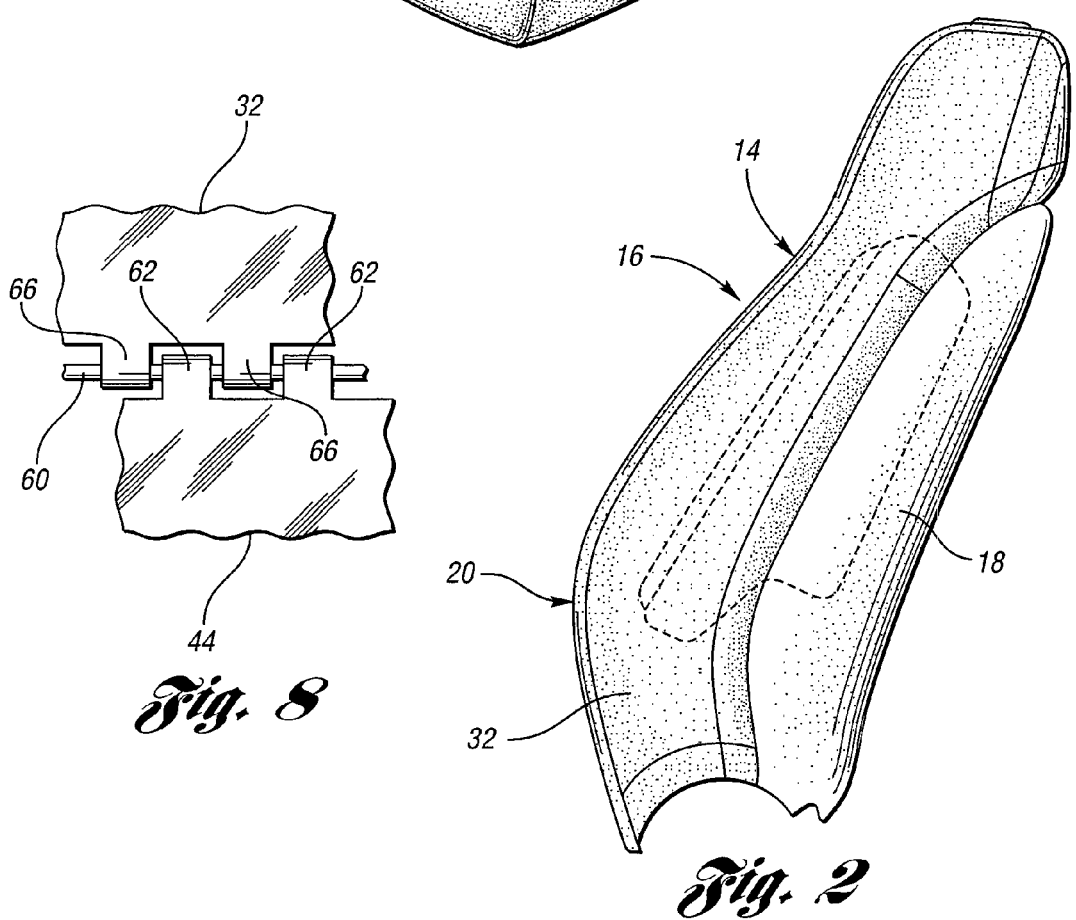

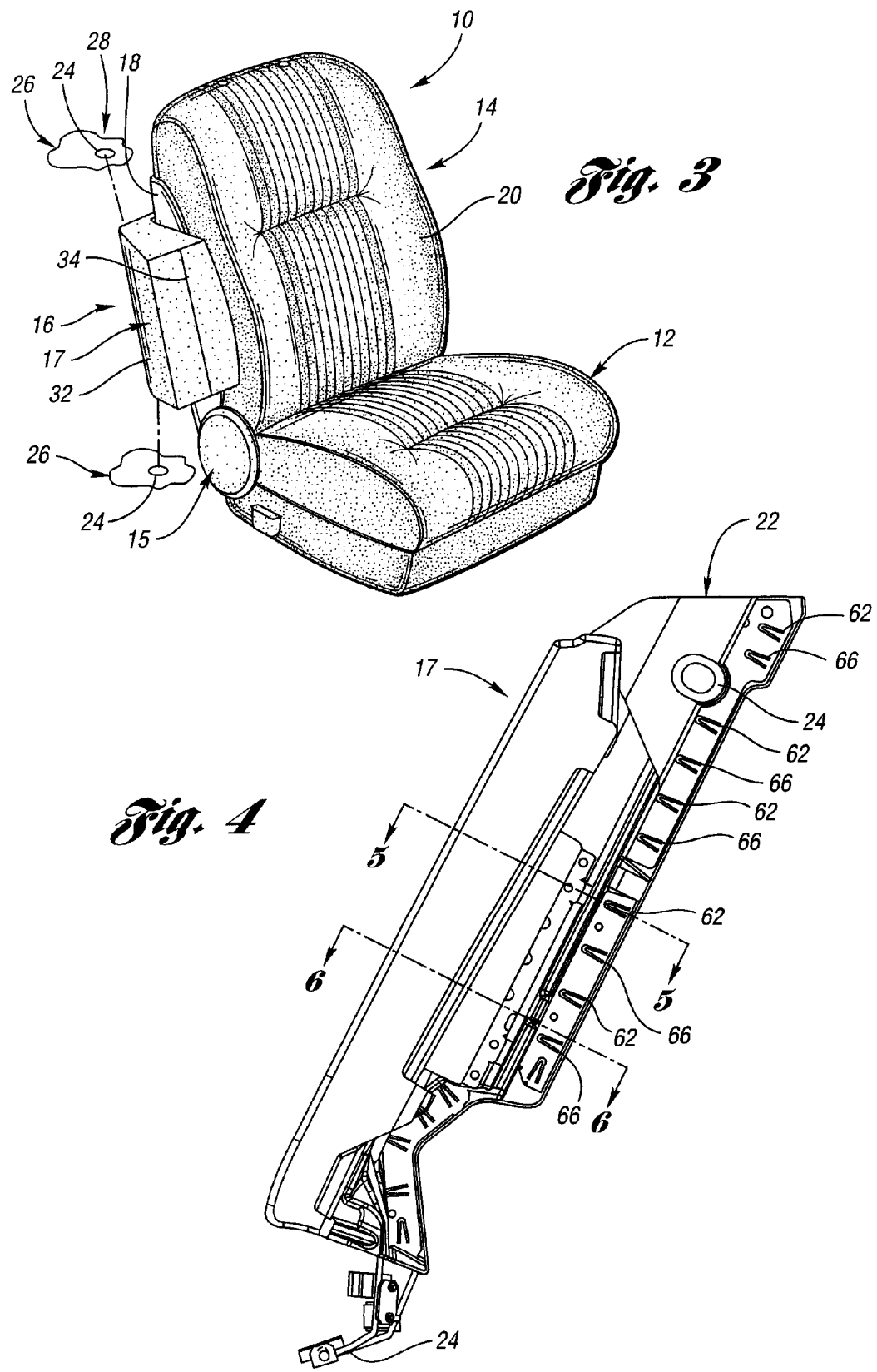

VEHICLE SEAT SIDE AIR BAG ASSEMBLY

CROSS-REFERENCE TO RELATED APPLICATIONS

This application claims foreign priority benefits under 35 U.S.C. §119(a)-(d) to DE 10 2006 053 911.7, filed Nov. 15, 2006, which is hereby incorporated by reference in its entirety.

BACKGROUND OF THE INVENTION

1. Field of the Invention

This invention relates to a vehicle seat side air bag assembly for providing vehicle occupant protection.

2. Background Art

Vehicles have previously included seat side air bag assemblies mounted on a vehicle seat back or on a vehicle adjacent a seat back to provide vehicle occupant protection. Such side air bag assemblies conventionally include a resilient bolster having a frame, a foam pad mounted by the frame, and a trim cover that covers the foam pad and has an air bag release seam through which an air bag upon deployment Is projected outwardly to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment. Other references noted by an investigation conducted in connection with the present invention include: U.S. Pat. No. 5,498,030 Hill et al.; U.S. Pat. No. 5,651,582 Nakano; U.S. Pat. No. 5,863,063 Harrell; U.S. Pat. No. 6,206,466 Komatsu; U.S. Pat. No. 6,254,122 Wu et al.; U.S. Pat. No. 6,293,580 Lachat et al.; U.S. Pat. No. 6,416,078 Lutz et al.; U.S. Pat. No. 6,450,528 Suezawa et al.; U.S. Pat. No. 6,481,744 Melia; and U.S. Pat. No. 7,004,496 Bossecker et al.; and United States Patent Application Publications: US 2002/0130537 Lotspih; US2 005/0006933 Bargheer et al.; and US 2006/0066078 Hofmann.

SUMMARY OF THE INVENTION

An object of the present invention is to provide an improved vehicle seat side air bag assembly for providing seat occupant protection.

In carrying out the above object, a vehicle seat side air bag assembly constructed in accordance with the invention includes a resilient bolster for mounting at a vehicle seat side location, and the bolster has a frame for mounting the bolster and a foam pad supported by the frame. A trim cover of the bolster extends over the foam pad and includes a release seam. An air bag module is mounted by the bolster and includes an inflator and an air bag that is inflated for deployment by the inflator. An air bag guide of the bolster has at least one panel that extends on opposite sides of the air bag module. The at least one flexible panel has a first panel outer extremity including a first connection to the bolster, at a location toward the trim cover from the air bag module and spaced from the release seam of the trim cover, and the at least one flexible panel having a second panel outer extremity including a second connection to the trim cover at its release seam in a spaced relationship from the first connection of the first panel outer extremity to the bolster. The panel may comprise two parts with one outer extremity at one panel part and the other outer extremity at the other panel part.

In one version, the bolster frame has mounts for mounting thereof on a lateral side of a seat back of a seat. Another version of the bolster has its frame provided with mounts for mounting thereof on a vehicle body adjacent a lateral side of a seat back of a seat.

As disclosed, the bolster includes a foam pad support wire, and the first connection of the first panel outer extremity of the air bag guide includes at least one connector connected to the support wire located toward the trim cover from the air bag module and spaced from the release seam of the trim cover. The trim cover includes a connection having at least one connector connected to the support wire. The foam pad support wire is disclosed as molded within the foam pad. Furthermore, the first connection of the first panel outer extremity of the air bag guide includes a plurality of spaced connectors connected to the support wire, and the trim cover includes a connection having a plurality of spaced connectors connected to the support wire in an alternating relationship with the spaced connectors of the first connection. Also, the foam pad includes a slit through which the at least one flexible panel extends from the air bag module to the second connection of its second panel outer extremity to the trim cover adjacent the release seam.

The objects, features and advantages of the present invention are readily apparent from the following detailed description of the preferred embodiments when taken in connection with the accompanying drawings.

BRIEF DESCRIPTION OF THE DRAWINGS

FIG. 1 is a perspective view of a vehicle seat including a seat back having a side air bag assembly constructed in accordance with the invention as part of a resilient bolster of the seat back.

FIG. 2 is a side elevational view of the vehicle seat back component taken along the direction of line 2-2 in FIG. 1 with the side air bag assembly thereof illustrated by hidden line representation.

FIG. 3 is a perspective view of another embodiment wherein the side air bag assembly of the invention includes a resilient bolster mounted by the vehicle body adjacent a lateral side of the seat.

FIG. 4 is a perspective view illustrating the hidden mounted side of the resilient bolster of the side air bag assembly.

FIG. 8 illustrates connection of an air bag guide and a trim cover of the bolster to a foam support wire of the bolster.

DETAILED DESCRIPTION OF THE PREFERRED EMBODIMENTS

Figure 5:
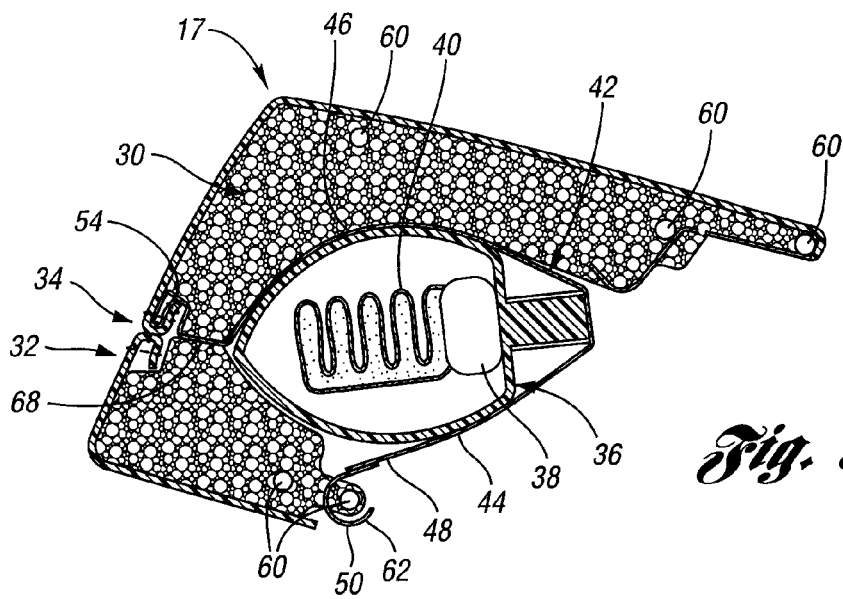
FIG. 5 is a sectional view taken along the direction of line 5-5 in FIG. 4 to illustrate an air bag module and an air bag guide that facilitates the deployment.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 15. The seat back component 14 includes a side air bag assembly 16 that is constructed in accordance with the present invention as it is hereinafter more fully described and operable to provide seat occupant protection. The side air bag assembly 16 includes a resilient bolster 17 that is illustrated as part of the seat back 14 outboard lateral side. Another embodiment of the seat 10 shown in FIG. 3 has the side air bag assembly 16 constructed to include a resilient bolster 17 that is mounted by an associated vehicle at the lateral outboard side of the seat. While the side air bag assembly 16 is shown on or adjacent seat back 14, which is a usage for which it has particular utility, it is also possible for the side air bag assembly to be utilized on or adjacent the seat bottom 12 even though the seat back usage is specifically disclosed. Also, as illustrated, the side air bag assembly 16 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions. As shown in FIG. 2, the seat back 14 may include a back panel 18 that is conventionally molded from plastic and also includes a front cushion 20 in which the side air bag assembly 16 is located in the FIG. 1 embodiment and adjacent which the side air bag assembly 16 is located in the FIG. 3 embodiment.

Figure 6:
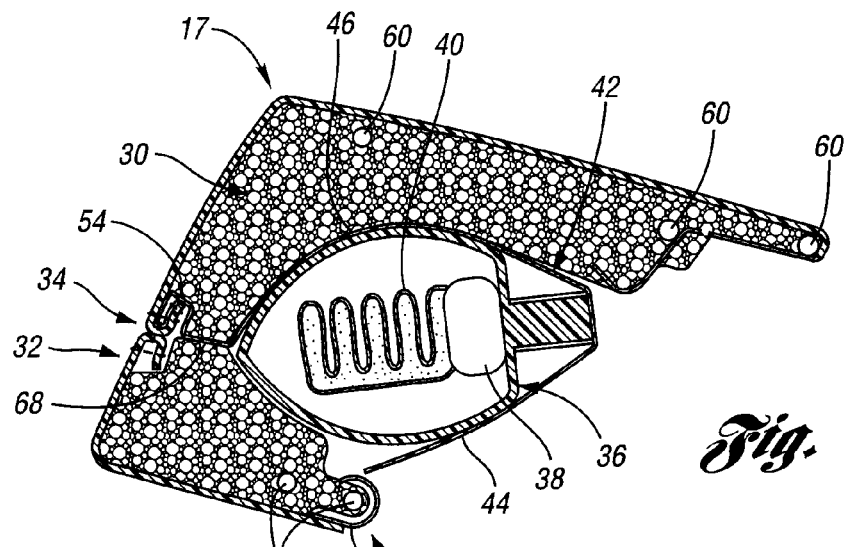
FIG. 6 is a sectional view taken along the direction of 6-6 in FIG. 4 and further illustrates the construction of the air bag module and the air bag guide.

As shown in FIG. 4, the resilient bolster 17 includes a frame collectively identified by 22 and having a pair of mounts 24 for mounting the bolster on a frame of the seat back 14 in the FIG. 1 embodiment or on spaced mounting locations 26 of a partially illustrated vehicle 28 in the FIG. 3 embodiment. The resilient bolster 17 includes a foam seat pad 30 that is shown in FIGS. 5 and 6 and that is mounted on the frame 22 (FIG. 3) in any suitable manner. A trim cover generally indicated by 32 extends over the foam pad 30 and includes an air bag release seam 34. An air bag module 36 of the bolster is located within the foam pad 30 and mounted on the bolster frame 22 in any suitable manner in a spaced relationship from the release seam 34. The air bag module 36 includes an inflator 38 and a schematically illustrated air bag 40 which may be folded or rolled and, upon deployment, the air bag is inflated by the inflator and projected outwardly from the bolster through the release seam 34 of the trim cover 32. The trim cover 32 may be made of cloth, vinyl or leather, etc.

As illustrated in FIGS. 5 and 6, the air bag assembly 16 includes an air bag guide 42 having at least one flexible panel with panel sides 44 and 46 that respectively extend from the air bag module 36 on its opposite sides, and as shown the panel is made of a single flexible sheet extending around the air bag module. The one panel side 44 has a first panel outer extremity 48 including a first connection 50 to the bolster at a location toward the trim cover 32 from the air bag module 36 and spaced from the release seam 34 of the trim cover. The other panel side 46 has a second panel outer extremity 52 including a second connection 54 to the trim cover 32 at its release seam 34 in a spaced relationship from the first connection 50 of the outer extremity 48 of the one panel side 44 as shown in FIG. 5. The panel may comprise two panel parts, wherein each panel side 44,46 is formed by one panel part, which may be connected to each other.

Figure 7:
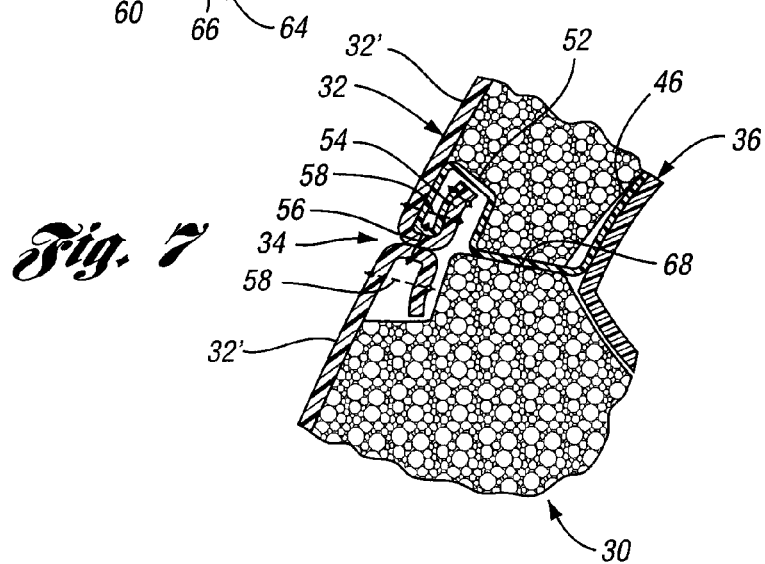
FIG. 7 is an enlarged view of a portion of FIGS. 5 and 6 to illustrate a release seam of a trim cover of the resilient bolster and an air bag guide panel securement of the air bag module.

As illustrated in FIG. 7, the release seam 34 includes stitching 56 of trim cover portions 32' to each other and also has stitching 58 that secures turned ends of the trim cover portions 32' to themselves. On the one side of their release seam 34, the outer extremity 52 of the panel side 46 is also secured by the stitching 56 and 58 to the adjacent trim cover portion 32'. Also, the foam pad 30 has a slit 68 through which the panel side 46 extends from the air bag module to the release seam.

As shown in FIG. 5, the foam pad 30 includes support wires 60 that as disclosed are molded in situ within the foam pad. The connection 50 of the one panel side 44 includes at least one connector 62 to one support wire 60 that is located toward the trim cover 32 from the air bag module 36 and spaced form the release seam 34 of the trim cover. More specifically as shown in FIG. 4, there are a plurality of the connectors 62 spaced from each other. In addition as shown in FIG. 6, the trim cover 32 includes a connection 64 to the one support wire 60 to which the one panel 44 is secured as shown in FIG. 5. This connection 64 includes at least one connector 66 and, as shown in FIG. 4, actually includes a plurality of spaced connectors 66 to the support wire in an alternating relationship with the spaced connectors 62 as shown in FIG. 8.

During the deployment of the air bag module 36, the inflator 38 inflates the air bag 40 which moves through the foam pad 30 guided by the flexible panel side 46 to the release seam 34 which then releases to permit the outward movement of the air bag to provide occupant protection. The panel 44, 46 may be made of any suitable flexible material effective to retrain and guide the air bag 40 from the module to the release seam. For example, a synthetic elastomer can be used as can a woven or non-woven cloth material, which may include natural materials or a synthetic material such as nylon. One material that is found to be effective is a polyester material of the type from which the air bag 40 may be manufactured. Regardless of the type of material used to make the air bag guide 42, the use of the air bag guide can be helpful in reducing friction on the air bag 40 as it is deployed. Although a polymer such as nylon may be particularly beneficial, even a fleece material will help reduce the friction on the air bag 40 because the air bag guide 42 decreases the contact between the deploying air bag 40 and the seat pad 30.

While the side air bag assembly 16 described above has particular utility for use with a vehicle seat back, especially at its outboard location, it is also possible for the side air bag to be utilized with other vehicle seat components such as with a seat bottom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat side air bag assembly, comprising:
    a resilient bolster for mounting at a vehicle seat side location and including a frame for mounting the bolster and a foam pad supported by the frame;
    a trim cover that extends over the foam pad and includes a release seam;
    an air bag module mounted by the bolster and including an inflator and an air bag that is inflated for deployment by the inflator; and
    an air bag guide having at least one flexible panel that extends on opposite sides of the air bag module and has a first panel outer extremity including a first connection to the bolster at a location toward the trim cover from the air bag module and spaced from the release seam of the trim cover, and the at least one flexible panel having a second panel outer extremity including a second connection to the trim cover at its release seam in a spaced relationship from the first connection of the first panel outer extremity to the bolster.

2. A vehicle seat side air bag assembly as in claim 1 whose frame has mounts for mounting thereof on a lateral side of a seat back of a seat.

3. A vehicle seat side air bag assembly as in claim 1 whose frame has mounts for mounting thereof on a vehicle body adjacent a lateral side of a seat back of a seat.

4. A vehicle seat side air bag assembly as in claim 1 wherein the bolster includes a foam pad support wire located toward the trim cover from the air bag module and spaced from the release seam of the trim cover, and the first connection of the first panel outer extremity including at least one connector connected to the support wire.

5. A vehicle seat side air bag assembly as in claim 1 wherein the bolster includes a foam pad support wire located toward the trim cover from the air bag module and spaced from the release seam, and the trim cover including a connection including at least one connector connected to the support wire.

6. A vehicle seat side air bag assembly as in claim 1 wherein the bolster includes a support wire molded within the foam pad at a location toward the trim cover from the air bag module and spaced from the release seam of the trim cover, the first connection of the first panel outer extremity of the air bag guide including a plurality of spaced connectors connected to the support wire, and the trim cover including a connection having a plurality of spaced connectors connected to the support wire in an alternating relationship with the spaced connectors of the first connection.

7. A vehicle seat side air bag assembly as in claim 1 wherein the foam pad includes a slit through which the at least one flexible panel of the air bag guide extends from the air bag module to the second connection of the second panel outer extremity to the trim cover at the release seam.

8. A vehicle seat side air bag assembly as in claim 1 wherein the bolster includes a support wire molded within the foam pad at a location toward the trim cover from the air baa module and spaced from the release seam of the trim cover, the first connection of the first panel outer extremity of the air bag guide including a plurality of spaced connectors connected to the support wire, the trim cover including a connection including a plurality of spaced connectors connected to the support wire in an alternating relationship with the spaced connectors of the first connection, and the foam pad including a slit through which the at least one flexible panel of the air bag guide extends from the air bag module to the second connection of the second panel outer extremity to the trim cover at the release seam.

9. A vehicle seat side air bag assembly, comprising:
a resilient bolster for mounting at a vehicle seat side location and including a frame for mounting the bolster and a foam pad supported by the frame and having a support wire molded therein;
a trim cover that extends over the foam pad and includes a release seam;
an air bag module mounted by the bolster and including an inflator and an air bag that is inflated for deployment by the inflator;
the support wire being located toward the trim cover from the air bag module and spaced from the release seam of the trim cover; and
an air bag guide having at least one flexible panel that extends on opposite sides of the air bag module, wherein the at least one flexible panel has a first panel outer extremity including a first connection including at least one connector that connects to the support wire of foam pad of the bolster and the at least one flexible panel having a second panel outer extremity including a second connection to the trim cover at its release seam in a spaced relationship from the first connection of the first panel outer extremity to the support wire of the foam pad.

10. A vehicle seat side air bag assembly, comprising:
a resilient bolster for mounting at a vehicle seat side location and including a frame for mounting a foam pad supported by the frame, the foam pad having a support wire and also having a slit;
a trim cover that extends over the bolster and includes a release seam;
an air bag module mounted by the bolster and including an inflator and an air bag that is inflated for deployment by the inflator, and the slit of the foam pad extending from the air bag module to the release seam on the trim cover;
the support wire being located toward the trim cover from the air bag module and spaced from the release seam of the trim cover;
an air bag guide having at least one panel that extends on opposite sides of the air bag module and has a first panel outer extremity including a first connection including a plurality of spaced connectors that connect to the support wire of foam pad of the bolster and the at least one flexible panel extending from the air bag module through the foam pad slit and having a second panel outer extremity including a second connection to the trim cover at its release seam in a spaced relationship from the first connection of the first panel outer extremity to the support wire of the foam pad; and
the trim cover including a connection including a plurality of spaced connectors that connect the trim cover to the support wire in an alternating relationship with the spaced connectors of the first connection.

11. The vehicle seat side air bag assembly as in claim 10 wherein the at least one flexible panel is a single panel that passes around the air bag module essentially opposite to the first and second outer panel extremities.

* * * * *

UNITED STATES PATENT AND TRADEMARK OFFICE
CERTIFICATE OF CORRECTION

PATENT NO. : 7,731,226 B2  Page 1 of 1
APPLICATION NO. : 11/939049
DATED : June 8, 2010
INVENTOR(S) : Silvia Zink It is certified that error appears in the above-identified patent and that said Letters Patent is hereby corrected as shown below:

Column 5, Line 47, Claim 8:

After "from the air" delete "baa" and insert -- bag --.

Signed and Sealed this

Seventeenth Day of August, 2010

David J. Kappos
*Director of the United States Patent and Trademark Office*